UNITED STATES PATENT OFFICE.

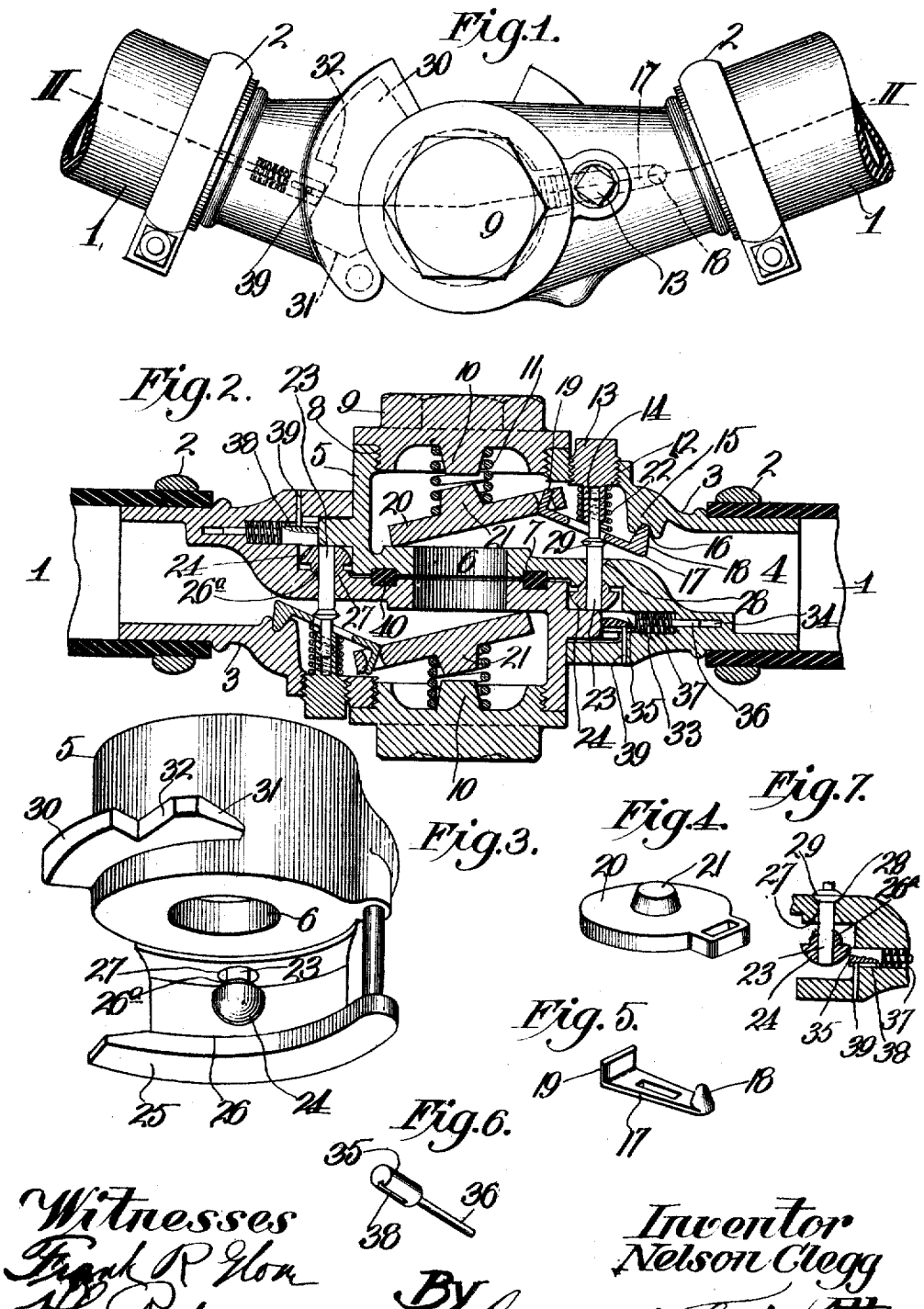

NELSON CLEGG, OF NEODESHA, KANSAS.

HOSE-COUPLING FOR AIR-BRAKES.

998,841. Specification of Letters Patent. Patented July 25, 1911.

Application filed July 13, 1910. Serial No. 572,399.

*To all whom it may concern:*

Be it known that I, NELSON CLEGG, a citizen of the United States, residing at Neodesha, in the county of Wilson and State of Kansas, have invented certain new and useful Improvements in Hose-Couplings for Air-Brakes, of which the following is a specification.

This invention relates to hose couplings for air-brakes and the like and is designed more particularly as an improvement on the hose coupling on which Patent No. 579,291 was issued March 23, 1897, to H. W. Cadott and C. C. Crewson, my object being to produce a coupling containing valves and means for efficiently and reliably maintaining the same in unseated position in the event of the disengagement of the couplings through the accidental or other separation of the cars.

With this general object in view, the invention consists in certain novel and peculiar features of construction and organization as hereinafter described and claimed; and in order that it may be fully understood reference is to be had to the accompanying drawings, in which;

Figure 1 is a side view of a hose coupling embodying my invention. Fig. 2 is a section on the line II—II of Fig. 1. Fig. 3, is an enlarged perspective view of one of the coupling heads. Fig. 4, is a detail perspective view of one of the valves. Fig. 5, is a detail perspective view of one of the valve unseating levers. Fig. 6, is a detail perspective view of one of the locking pins. Fig. 7, is a section showing the valve-unseating pin and the locking pin in the positions which they occupy when the valves are closed.

In the said drawing, 1 indicates two similar sections of hose of the type employed in air brakes and analogous apparatus and secured in the end of each section by means of a clamp 2 or other suitable means is a hollow coupling head 3, the head comprising a stem 4 upon which the hose section is clamped and a cylindrical body 5, the said body having flat faces or ends. The inner end is provided with a central opening 6, and a surrounding groove 7. The outer end of the body is formed with a large threaded opening 8 normally closed by a screw cap 9, provided centrally with an inwardly projecting lug 10, to receive the outer end of a spring 11. The stem 4 is curved so that the inner face or end of the body shall lie in the vertical plane of the center of that portion of the stem fitting in the hose section and in the outer wall of the curved portion of the stem is formed a threaded opening 12 closed by a plug 13, having a hollow inwardly projecting stem 14, and at the opposite side of the plug from the said body the outer wall of the stem is provided with an inwardly projecting lug 15 having a recess 16, to receive and form the fulcrum point of a longitudinally-slotted lever 17, the lever at one end having a pivot lug 18, engaging said recess and being provided at its opposite end with an outwardly projecting arm 19 bearing a loose hinged relation with a disk valve 20, disposed within the said body and provided with an outwardly projecting lug 21 receiving the inner end of the spring 11 hereinbefore referred to, which spring is intended when not prevented or overpowered, to seat the valve and thus close the opening 6.

Mounted upon the hollow stem 14 of plug 13 is a spring 22 which bears at one end against the plug and at the other end against the outer side of lever 17, which spring is adapted for swinging lever 17 inward when not prevented or overpowered, and said spring by such action coöperates with spring 11 in the seating of the valve, though such is not its primary function, as the spring 11 is capable of accomplishing such result unaided. The principal function of spring 22 is for pressing inwardly against the lever to impart longitudinal movement to a pin 23 which extends slidingly through the inner wall of the stem adjacent to the body and terminates in a press button 24, between said stem and the segment-shaped hook 25 cast integral with the stem, the inner face of said hook preferably paralleling the adjacent or inner face or end of the said body.

The head of button 24 is provided with a reduced rounded end 26, for a purpose which hereinafter appears and with a conical projection 26ª adapted to engage with a valve relation the ground cavity 27 in the wall of the stem, so as to constitute an air-tight joint therewith at certain times. The inner face of the same wall of the stem is provided with a similar cavity 28 for engagement at times by an enlargement 29 of said stem, the enlargement 29 also constituting a valve which when engaged with the cavity 28 prevents the escape of air from the stem around the pin 23. The valve 29 also bears against the inner face of the lever 17 and at its outer end is reduced to extend through the wall of said lever, and fit slidingly in the hollow inwardly projecting stem of the plug 13.

The body is provided at the side opposite from the stem with an outwardly projecting segmental wedge 30, which is beveled or tapered at one end at 31 and at an intermediate point the wedge is provided with a ratchet-tooth-shaped notch 32. The hook-shaped portion of the stem is provided with a longitudinal socket 33 having a reduced portion 34 and fitting in said socket is a locking pin 35, having a reduced stem 36, fitting in the reduced portion 34 of the socket and fitting in the latter is a spring 37 tending to hold the pin projected into the hook 25 for the purpose of preventing the seating of the valve at certain times.

The locking pin is provided with a groove 38 engaged by a pin 39, which pin guards against the dislocation of the locking pin. The coupling is provided with a gasket 40 occupying groove 7.

Assuming that the adjacent ends of the hose sections are to be coupled together and that the valves of each are seated over their respective openings 6, the bodies are fitted together so that the couplings shall engage, the wedge 30 of each head being fitted in the hook 25 of the other head with the wall of each head fitting snugly against the other head. The heads are then rotated slightly to cause the beveled portions 31 of the wedges to engage the ends of the opposing locking pins and force the same out of the hooks and beyond the plane of reciprocatory movement of the buttons 24. At the same time the wedges by bearing against the terminals of the hooks 25 force the pins 23 outwardly and rock the levers outwardly against the resistance of the springs 22, this outward movement of the levers swinging the valves outward against the resistance of springs 11, it being apparent that the action of the wedges on the hook terminals also acts to clamp the gaskets of the bodies of the couplings together so as to establish an air-tight joint between the same. It will thus be seen that the coupling together of the hose sections opens up communication between them. By the time the couplings have attained the position shown in Figs. 1 and 2, the notches 32 of the wedges register with and receive the locking pins 35, the abrupt ends of the notches limiting the rotatable movement of the parts of the couplings. The pins when thus advanced serve to prevent the reseating of the valves should the cars become accidentally uncoupled and therefore effect a separation of the bodies of the coupling. When thus unseated the air brakes will of course be instantly applied because of the escape of the air through openings 6. Should an authorized person uncouple the cars and the hose sections, the inclined bottoms of the notches 32 will force the pins out of the path of the buttons as the uncoupling action is completed so that said buttons may be moved by the levers 17 until their reduced rounded ends 24 are in the path of the locking pins 35, it being understood that when the buttons are so adjusted the valves close openings 6, and prevent the application of the brakes.

From the above description it will be apparent that I have produced a hose coupling for air-brakes embodying the features of advantage enumerated as desirable and I wish it to be understood that I do not desire to be restricted to the exact details of construction shown and described as obvious modifications will suggest themselves to one skilled in the art.

Having thus described the invention what I claim as new and desire to secure by Letters Patent, is:—

1. In a hose coupling, a hollow head, comprising a stem and a body, the latter having its inner wall flat and provided with an opening, a valve within the body, a spring tending to cause the valve to close said opening, a lever pivotally connected at one end to the valve and bearing a fulcrumed relation at its other to said stem, a pin suitably arranged and adapted when moved in one direction to operate said lever and unseat the valve, a locking pin, a spring tending to advance the locking pin into the path of return movement to prevent the seating of the valve, and means to prevent dislocation of the locking pin.

2. In a hose coupling, a hollow head, comprising a stem and a body, the latter having its inner wall flat and provided with an opening, a valve within the body, a spring tending to cause the valve to close said opening, a lever pivotally connected at one end to the valve and bearing a fulcrumed relation at its other end to the stem, a pin suitably arranged and adapted when moved in one direction to operate said lever and unseat the valve, and a locking pin for automatically locking the first-named pin after the latter has been moved to effect the unseating of the valve, in combination with a similar head provided with a wedge for forcing the locking pin out of the path of the first-named pin and for imparting endwise movement to the latter to operate said lever and effect the unseating of the valve.

3. In a hose coupling, a hollow head, comprising a stem and a body, the latter having its inner wall flat and provided with an opening, a valve within the body, a spring tending to cause the valve to close said opening, a lever pivotally connected at one end to the valve and bearing a fulcrumed relation at its other end to the stem, a pin suitably arranged and adapted when moved in one direction to operate said lever and unseat the valve, and a locking pin for automatically locking the first-named pin after the latter has been moved to effect the unseating of the valve; in combination with a similar head provided with a wedge for forcing the locking pin out of the path of the first-named pin and for imparting endwise movement to the latter to operate said lever and effect the unseating of the valve; said wedge having a peripheral notch to receive the locking pin after the first-named pin has been caused to effect the unseating of the valve.

4. In a hose coupling, a hollow head, comprising a stem and a body the latter having its inner wall flat and provided with an opening, a valve within the body, a spring tending to cause the valve to close said opening, a lever pivotally connected at one end to the valve and bearing a fulcrumed relation at its other end to said stem, a pin suitably arranged and adapted when moved in one direction to operate said lever to unseat the valve, a hook receiving the inner end of said pin, and a locking pin for automatically locking the first-named pin after the latter has been moved to effect the unseating of the valve.

5. In a hose coupling, a hollow head, comprising a stem and a body the latter having its inner wall flat and provided with an opening, a valve within the body, a spring tending to cause the valve to close said opening, a lever pivotally connected at one end to the valve and bearing a fulcrumed relation at its other end to said stem, a pin suitably arranged and adapted when moved in one direction to operate said lever to unseat the valve, a hook receiving the inner end of said pin, and a locking pin for automatically locking the first-named pin after the latter has been moved to effect the unseating of the valve; in combination with a similar head provided with a wedge to engage the hook and said first-named pin to cause the latter to unseat the valve and to also engage the locking pin to force the same out of the path of the first-named pin and provided with a beveled front end and with a peripheral notch for successive engagement by and reception of said locking pin, and means for establishing an air-tight joint between said heads.

In testimony whereof I affix my signature, in the presence of two witnesses.

NELSON CLEGG.

Witnesses:
C. A. BOATMAN,
J. A. DEARDORFF.